United States Patent
Schaeferling et al.

(10) Patent No.: US 8,182,313 B2
(45) Date of Patent: May 22, 2012

(54) CARRIAGE ARRANGEMENT FOR A MACHINE TOOL

(75) Inventors: Karl Schaeferling, Unterschleissheim (DE); Ralf Boennemann, Oberschleissheim (DE); Johann Mall, Fuerstenfeldbruck (DE)

(73) Assignee: The Gleason Works, Rochester, NY (US)

( * ) Notice: Subject to any disclaimer, the term of this patent is extended or adjusted under 35 U.S.C. 154(b) by 944 days.

(21) Appl. No.: 12/215,127

(22) Filed: Jun. 25, 2008

(65) Prior Publication Data

US 2009/0010729 A1    Jan. 8, 2009

(30) Foreign Application Priority Data

Jul. 4, 2007   (DE) .............................. 102007030956

(51) Int. Cl.
    *B24B 49/00*    (2006.01)
(52) U.S. Cl. ........... 451/11; 451/180; 451/242; 451/246
(58) Field of Classification Search ..................... 451/10, 451/11, 127, 166, 179, 180, 242, 246
    See application file for complete search history.

(56) References Cited

U.S. PATENT DOCUMENTS

| | | | |
|---|---|---|---|
| 2,322,619 A * | 6/1943 | Ekholm ........................ | 451/242 |
| 4,083,151 A * | 4/1978 | Jessup et al. .................. | 451/242 |
| 4,584,794 A * | 4/1986 | Hirohata ....................... | 451/160 |
| 5,443,338 A | 8/1995 | Huber et al. | |
| 5,558,567 A * | 9/1996 | Hedberg ....................... | 451/242 |
| 5,643,051 A * | 7/1997 | Zhou et al. ...................... | 451/11 |
| 5,766,057 A * | 6/1998 | Maack ............................ | 451/21 |
| 7,083,500 B2 * | 8/2006 | Junker ............................ | 451/10 |
| 7,179,025 B2 * | 2/2007 | Kreh ................................ | 409/26 |
| 7,874,895 B1 * | 1/2011 | Toycen .......................... | 451/11 |
| 2007/0281588 A1 * | 12/2007 | Hirose et al. ................... | 451/11 |
| 2010/0173571 A1 * | 7/2010 | Kobayashi .................... | 451/243 |

FOREIGN PATENT DOCUMENTS

| | | |
|---|---|---|
| DE | 9300936 U1 | 5/1993 |
| DE | 4323935 | 10/1994 |
| DE | 10245058 | 4/2004 |
| EP | 0213361 A | 3/1987 |

OTHER PUBLICATIONS

Extended European Search Report for EP 08008860.2 with English translation.
Official Action from German Patent Office for DE 10 2007 030 956.4 (with English translation).

* cited by examiner

*Primary Examiner* — Eileen P. Morgan
(74) *Attorney, Agent, or Firm* — Robert L. McDowell

(57) ABSTRACT

A carriage arrangement for a machine tool, which can be adjusted similar to a compound slide, has an increased rigidity against a machining force being taken up by said arrangement in that according to the invention a first carriage (1) can be adjusted relative to a machine base (4) along a first trajectory that is tilted toward the direction of force, and a second carriage loaded with the machining force can be adjusted at the first carriage along a second trajectory that is orthogonal to the direction of force (FIG. 1).

13 Claims, 2 Drawing Sheets

CARRIAGE ARRANGEMENT FOR A MACHINE TOOL

This application claims the benefit of German Patent Application No. 10 2007 030 956.4 filed Jul. 4, 2007.

FIELD OF THE INVENTION

The invention relates to a carriage arrangement for a machine tool having a first carriage that is movably guided in a trajectory in a first plane at a base area, and a second carriage which is movably guided at the first carriage according to a second trajectory in a second plane and moves a work piece and a tool relatively toward one another according to a specified machining process, and a power flow that corresponds to a machining power introduced into the second carriage in the direction of the introduction of power and runs through the first carriage to the base area which consumes the machining power.

BACKGROUND OF THE INVENTION

In a known machine tool with a like carriage arrangement (DE 43 23 935 C1), the first carriage is supported on the top side of the base area that is formed by an area of the machine frame of the machine tool in such a way that the first plane is horizontal and the first trajectory located therein runs straight. The second carriage is guided at an outer side of the first carriage orthogonal to the first trajectory in such a way that the second plane and the second trajectory located therein run vertically. The tool, which has internal toothing, for example a honing wheel, is disposed to be driven in a rotary fashion on an outer side of the second carriage facing away from the first carriage, in a tool head arranged thereon. Furthermore, said tool head can be angularly adjusted relative to the second carriage around an axis parallel to the trajectory of the first carriage. For example, the work piece, which is a gear wheel blank to be finished, is clamped on a work piece spindle that is rotationally disposed in a spindle stock, with the spindle stock and a cooperating tail stock being longitudinally adjustable along a third trajectory orthogonal to the first and second trajectory.

The movements of the two carriages and the spindle stock are controlled such that the work piece and the tool are moved relatively toward one another according to a specified machining process. With this arrangement, the machining power required by the machining action between the tool and the work piece is introduced into the second carriage, which creates a flow of power through the first carriage toward the base area that consumes the machining power. Because the second carriage and the tool head arranged thereon horizontally overhangs the essentially vertical outer side of the first carriage, the power flow is essentially horizontal there and is redirected to an essentially vertical flow toward the base area in the transfer into the first carriage. This reduces the rigidity of the arrangement, which causes it to deform undesirably under the influence of the machining power.

An object of the invention is to create a carriage arrangement for a tool machine of the type mentioned above, which has a greater rigidity with respect to the power flow.

SUMMARY OF THE INVENTION

The above object of the invention is attained in that the second plane is orthogonal to the direction of power introduction, that the first plane is tilted relative to the second plane and the first trajectory runs in the direction of said tilt, and that the power flow in the first carriage, the second carriage and the base area runs essentially parallel to the direction of power transfer.

In this way, the power flow in the carriage arrangement in accordance with the invention runs essentially parallel to the direction of power transfer and straight as well as orthogonally to the guide plane of the second carriage. As a result, the carriage arrangement has a very high rigidity to the machining power similar to a column loaded with power in longitudinal direction and suffers practically no bending momentum that could lead to a deformation.

DETAILED DESCRIPTION OF THE INVENTION

The following description explains the invention in greater detail by using the example of a gear wheel honing machine and reference to the drawings which represent the invention by way of example only.

Figure 1:
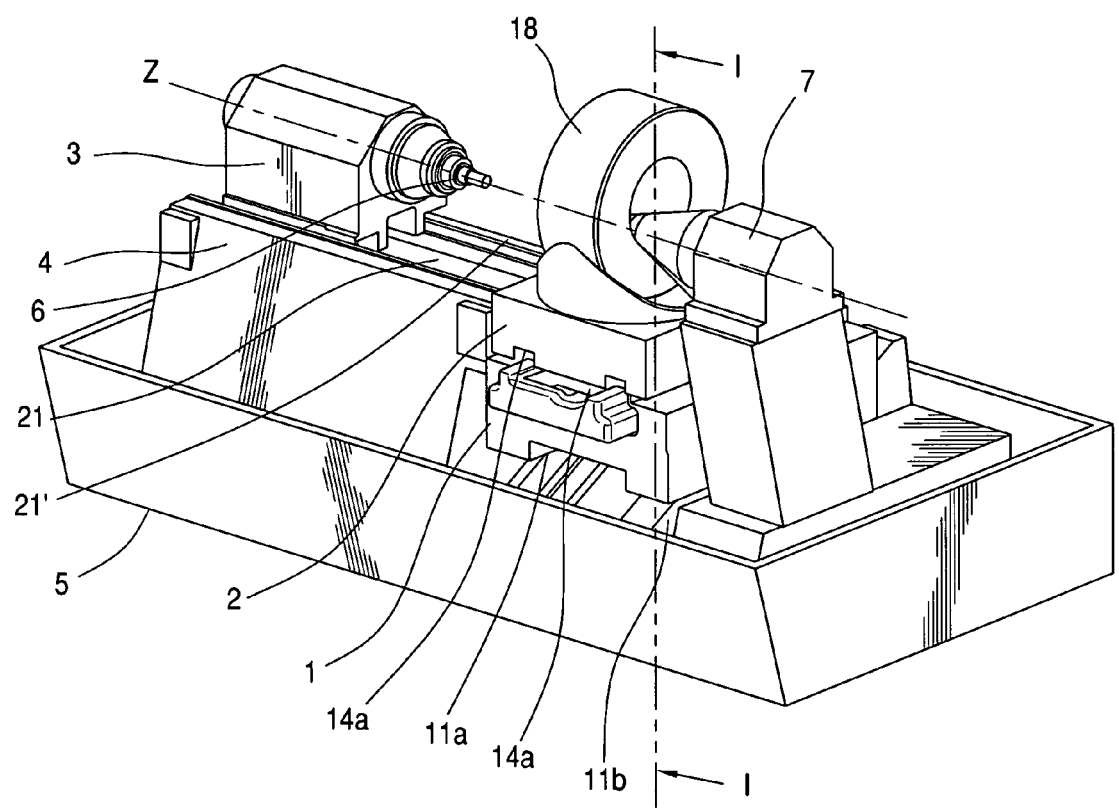
FIG. 1 illustrates a schematic representation of a gear wheel honing machine in perspective view.

The gear wheel honing machine shown schematically in FIG. 1 has a first carriage 1, a second carriage 2 and a third carriage 3, which are adjustable relative to a machine bed 4 that is supported on machine mounts 5. The third carriage 3 supports a rotationally driven work piece spindle 6, and the axis of rotation of said spindle forms the work piece axis. The work piece axis is shown in FIG. 1 as a dash-dot line and has the reference symbol Z. Also arranged on the machine bed 4 in contrast to the tool spindle 6 is a tailstock 7 that is in alignment with the work piece axis Z.

Figure 2:
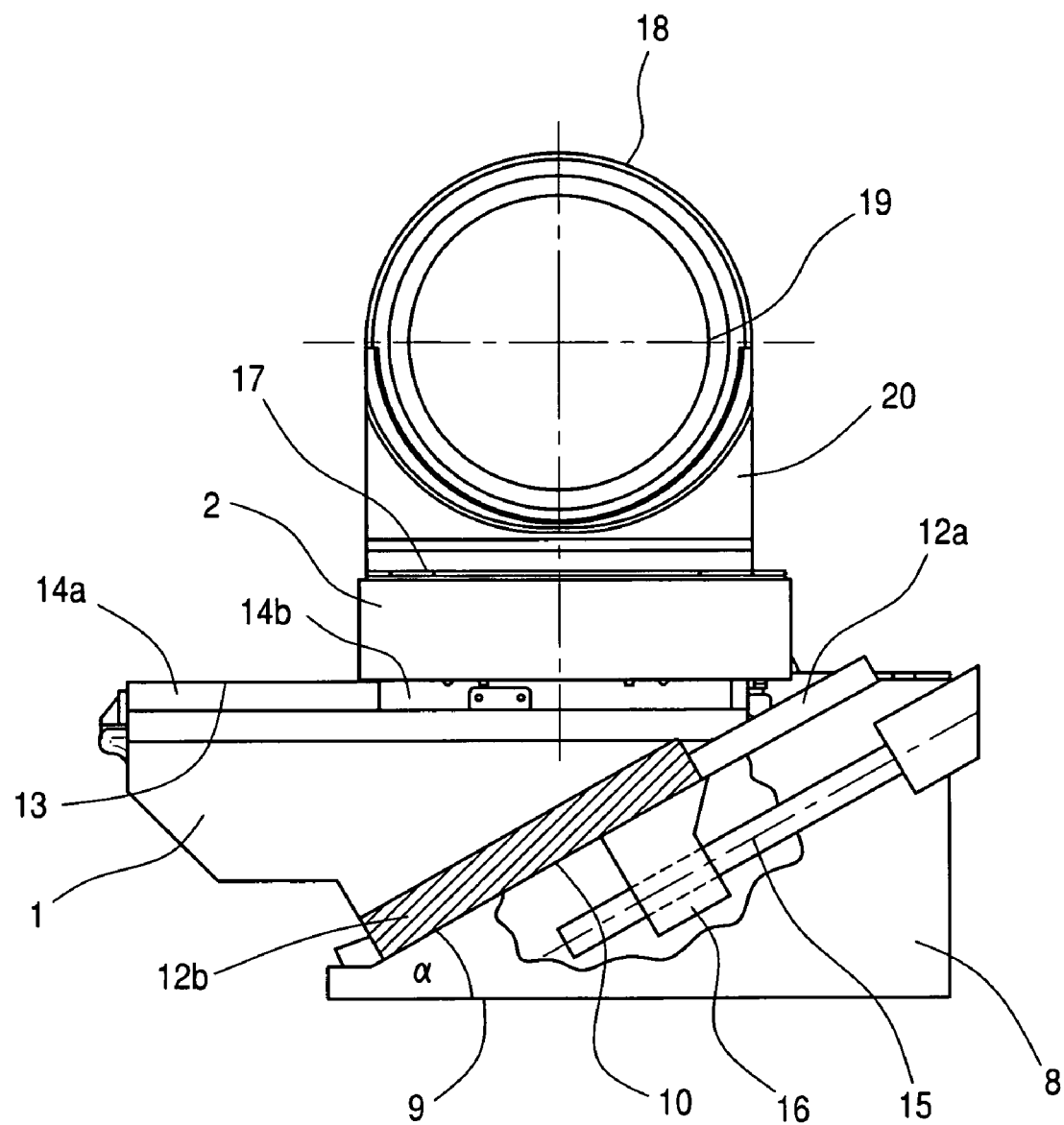
FIG. 2 is a schematic section according to line I-I in FIG. 1.

FIG. 2, which shows an orthogonal schematized sectional view according to Line I-I in FIG. 1 relative to the work piece axis, reveals a base area 8 at a horizontal area 9 of the machine bed 4, which has an upper side 10 opposite to the machine bed 4, which is tilted at an acute angle $\alpha$ relative to the horizontal area 9. At the base area 8, the first carriage 1 is movably guided along its first trajectory, which is in a first plane that is tilted at said acute angle $\alpha$ and parallel to the work piece axis Z. The first trajectory runs in the direction of the tilt of the first plane and thus orthogonally to the work piece axis Z. A pair of linear guides, such as slide guides or linear roll guides, for example, is provided to guide the first carriage 1 along its first trajectory, with one each guide of the pair being arranged along an area of the first carriage 1 that borders one of the two orthogonal lateral edges 11a, 11b relative to the work piece axis Z.

The sectional view shown in FIG. 2, which runs through said area, shows schematically a first guide member 12a fixed at the upper side 10 of the base area 8 tilted according to the first plane, and a sliding second guide member 12b guided thereon, which is fixed at the first carriage 1. The first guide member 12a and the second guide member 12b thus jointly form one of the aforementioned linear guides.

FIG. 1 and FIG. 2 furthermore show that the on the upper side 13 of the first carriage 1, which is opposite to the upper side 10 of the base area 8, first guide elements 14a of a pair of linear guides are fixed, and their second guide element 14b, which is in sliding engagement therewith, is fixed at the lower side of the second carriage 2, which faces the upper side 13 of the first carriage 1. With these guides 14a, 14b, the second carriage 2 is movably guided according to a second trajectory located in a second horizontal plane, with said second trajectory, as well as the first trajectory, running parallel to an orthogonal plane relative to the first and the second plane.

A broken-away area in FIG. 2 shows a section through a plane that is orthogonal relative to the work piece axis Z, and both guides of each pair have the same distance from said plane. This section shows a part of the drive that can adjust the first carriage 1 along its first trajectory. The drive has a threaded spindle 15 controlled by an electromotor, which has a longitudinal axis that runs parallel to the first trajectory. The threaded spindle intersperses a complementary threaded boring in an area 16 of the first carriage 1 provided for this purpose. With a rotary drive of the threaded spindle 15 fixed stationary relative to the base area 8, the area 16 with the threaded boring is displaced along its longitudinal axis which adjusts the carriage 1 along its first trajectory. Instead of the threaded spindle drive, it is also possible, for example, to provide a linear motor that acts along the first trajectory. The drive of the second carriage 2 along the guides 14a, 14b occurs with a similarly developed spindle drive of linear motor.

With appropriate control of said drives, the second carriage 2 can be adjusted relatively to the base area 8 and the machine bed 4 horizontally as well as vertically in a plane that is orthogonal to the work piece axis Z, and the horizontal and the vertical adjustment path can be set independently or dependently of one another.

FIG. 1 and FIG. 2 further show that an essentially annular tool head 18 may be arranged on the horizontal upper side 17 of the second carriage 2, which faces away from the base area 8, and an internally geared honing tool 19 can be received in the internal ring space of said tool head. The tool head 18 has a rotary drive 20, which is schematically indicated in FIG. 2, to rotate the honing wheel 19 around a tool axis that runs through its center. Furthermore, the tool head 18 is angularly adjustable on the second carriage 2 by an axis that is orthogonal, i.e., vertical to the second plane. The angular adjustment can be controlled by a servo drive, for example.

FIG. 1 furthermore shows that the third carriage 3 on the machine bed 4 can be adjusted on the guides 21, 21', which are similar to the guides of the first and the second carriage, by a spindle drive or a linear motor along a third trajectory, which runs parallel to the work piece axis Z. In the same way, the tailstock 7 can be adjusted on the machine bed 4 parallel to the work piece axis Z.

To machine a work piece clamped on the work piece spindle 6 (i.e. a gear wheel blank to be honed), the third carriage 3 is adjusted along its third trajectory in the direction of the tool head 18 so that the work piece can engage with the honing tool 19 for machining. Furthermore, the tailstock 7 is driven against the work piece, which is in machining position. The machining force caused by the machining action between the tool and the work piece is essentially transferred vertically into the second carriage 2 and essentially transferred parallel to said power transfer direction to the machine bed 4 which takes up the machining power. The power transfer chain consisting of the second carriage, the first carriage and the base area 8 is essentially used like a vertical column that is loaded with pressure in its longitudinal direction. Therefore, there are no bending moments worth mentioning which would compromise the rigidity of the inventive arrangement.

The movement of the first carriage along the first trajectory leads to a simultaneous parallel and orthogonal adjustment relative to the direction of power transfer due to the tilt of the first plane. The second carriage, which follows said adjusting movement, can be adjusted independently along the second trajectory orthogonally to the direction of power transfer. Because the direction of the tilt is determined by the section of the first plane and an orthogonal plane relative to the first and second plane, the orthogonal trajectory component of the first carriage relative to the direction of power transfer runs parallel to the second trajectory of the second carriage in as far as the latter is aligned parallel to the orthogonal plane relative to the first and second plane. In this way, the adjustment movement of the second carriage along its second trajectory can be combined with the adjustment of the first carriage orthogonally to the direction of power transfer when it moves along the first trajectory in such a way that the second carriage can be adjusted relative to the base area in a total of two independent longitudinal directions, i.e. parallel and orthogonal to the direction of power transfer, without the carriage arrangement having overhanging areas orthogonal to the direction of power transfer which may suffer deformation under the action of the machining power.

Among the many applications for the carriage arrangement in accordance with the invention are ones that include machine tools having a machine bed with an essentially horizontal area on which the base area of the carriage arrangement forms a vertical protrusion. In this case, the second carriage in particular can be horizontally and vertically adjusted relative to the machine bed corresponding to the function of a compound slide rest. These machine tools can be machines for the production or finishing of gear wheels, for example.

In particular, the tool can be arranged on the second carriage. If the tool is a honing wheel, a tool head that receives and drives the honing wheel is arranged on the second carriage. If the tool is another gear machine tool, such as a circular gear shaving cutter, a finishing cutter, a hob grinding disk, a hob or the like, a tool head that receives and drives said tool is arranged on the second carriage.

Furthermore, it may be provided that the tool can be adjusted around an orthogonal axis relative to the second plane. In particular, said adjustment may occur in the form of a controlled movement driven by a servo drive provided for said purpose. In the case of a honing wheel, the tool head that receives the honing wheel is supported on the second carriage and can be adjusted around the orthogonal axis.

The present invention also provides that the work piece is arranged at a third carriage that can be adjusted along a third trajectory parallel to the second plane. In particular, said third trajectory may also run orthogonal to the second trajectory. In the case of finishing gear wheel blanks with the honing wheel, said third trajectory is in particular orthogonal to the plane in which the two adjustment directions of the second carriage are located.

The guides for the carriages can be slide guides as well as linear roll guides. Spindle drives or linear motors can be used, for example, to drive the carriages along their respective trajectory.

LIST OF REFERENCE SYMBOLS

1 first carriage
2 second carriage
3 third carriage
4 machine bed
5 machine frame
6 work piece spindle
Z work piece axis
7 tailstock
8 base area
9 horizontal area
10 top side of the base area
α acute angle
11a, 11b lateral edge 12a first guide element
12b second guide element
13 top side of the first carriage
14a first guide element
14b second guide element
15 threaded spindle
16 area of the first carriage
17 top side of the second carriage
18 toolhead
10 honing tool
20 rotary actuator
21, 21' guides While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. Carriage arrangement for a machine tool, said machine tool creating machining forces acting on the carriage arrangement during a machining process, said carriage arrangement comprising:
   a first carriage (1) having a horizontal upper surface and movably guided on a base (8) along a first trajectory in a first plane;
   a second carriage (2) movably guided on said first carriage along a second trajectory in a second plane; said second plane being horizontal and parallel to the upper surface of the first carriage and said first plane being tilted relative to said second plane;
   wherein, as defined in a plane orthogonal to said first and second planes,
   said second trajectory extends horizontally in the direction of said second plane and
   said first trajectory extends in the direction of the tilt of said first plane;
   said first trajectory thereby comprising a horizontal component of motion of said first carriage and a vertical component of motion of said first carriage, said horizontal component of motion of said first carriage being parallel to the horizontal motion of said second carriage along said second trajectory,
   whereby the horizontal movement of the second carriage is capable of being combined with movement of the first carriage along the first trajectory in a manner enabling the second carriage to be adjusted relative to the base in the horizontal and vertical directions without creating overhanging areas of the second carriage such that the second carriage maintains position over the base to prevent deformation due to said machining forces.

2. Carriage arrangement in accordance with claim 1 characterized in that the base area (8) is developed in an essentially horizontal area (9) of a machine bed (4).

3. Carriage arrangement in accordance with claim 2 characterized in that an upper side (10) of the base area opposite to the machine bed (4) runs essentially parallel to the first plane.

4. Carriage arrangement in accordance with claim 1 further comprising carriage guides (12a, 12b; 14a, 14b) characterized in that the guides (12a, 12b; 14a, 14b) of the carriages are linear slide ways.

5. Carriage arrangement in accordance with claim 1 further comprising carriage guides (12a, 12b; 14a, 14b) characterized in that the guides (12a, 12b; 14a, 14b) of the carriages are slide guides.

6. Carriage arrangement in accordance with claim 1 characterized in that the carriages (1, 2) are driven by spindle drives operating along their trajectory.

7. Carriage arrangement in accordance with claim 1 characterized in that the carriages (1, 2) are driven by linear motors operating along their trajectory.

8. Carriage arrangement in accordance with claim 1 characterized in that a tool (19) is located on the second carriage (2).

9. Carriage arrangement in accordance with claim 8 characterized in that the tool (19) can be adjusted around an axis orthogonal to the second plane.

10. Carriage arrangement in accordance with claim 8 characterized in that the tool (19) is a gear wheel precision machine tool, in particular a honing cutter, a circular gear shaving cutter, finishing cutter, a grinding disk, profiled grinding disk, hob grinding disk, or the like.

11. Carriage arrangement in accordance with claim 1 characterized in that the work piece is arranged at a third carriage (3) that can be adjusted along a third trajectory parallel to the second plane.

12. Carriage arrangement in accordance with claim 11 characterized in that the third trajectory runs orthogonal to the second trajectory.

13. Carriage arrangement in accordance with claim 12 characterized in that the work piece is a gear wheel blank.

* * * * *